(12) United States Patent
Boileau et al.

(10) Patent No.: US 9,487,416 B2
(45) Date of Patent: Nov. 8, 2016

(54) METHOD OF FILTERING WATER USING AN ELECTRICALLY ACTIVE POLYMER COMPOSED OF PYRROLE MONOMERS HAVING COUNTER ANIONS ASSOCIATED THEREWITH

(71) Applicant: MCB Ingenuity Limited, Winnipeg (CA)

(72) Inventors: Michael Boileau, Winnipeg (CA); Laurel Ann McEachern, Winnipeg (CA)

(73) Assignee: MCB Ingenuity Limited, Winnipeg, Manitoba (CA)

( * ) Notice: Subject to any disclaimer, the term of this patent is extended or adjusted under 35 U.S.C. 154(b) by 162 days.

(21) Appl. No.: 13/887,705

(22) Filed: May 6, 2013

(65) Prior Publication Data

US 2014/0144841 A1    May 29, 2014

Related U.S. Application Data

(60) Provisional application No. 61/642,870, filed on May 4, 2012.

(51) Int. Cl.
| | |
|---|---|
| C02F 1/28 | (2006.01) |
| C02F 1/42 | (2006.01) |
| B01J 41/12 | (2006.01) |
| B01J 20/20 | (2006.01) |
| B01J 20/26 | (2006.01) |
| B01J 20/10 | (2006.01) |
| B01J 20/28 | (2006.01) |

(52) U.S. Cl.
CPC .............. *C02F 1/42* (2013.01); *B01J 20/103* (2013.01); *B01J 20/20* (2013.01); *B01J 20/205* (2013.01); *B01J 20/261* (2013.01); *B01J 20/262* (2013.01); *B01J 20/28052* (2013.01); *B01J 41/12* (2013.01); *C02F 1/28* (2013.01); *C02F 1/281* (2013.01); *C02F 1/283* (2013.01); *C02F 1/285* (2013.01)

(58) Field of Classification Search
CPC ............ C02F 1/28; C02F 1/42; C02F 1/281; C02F 1/283; C02F 1/285; C02F 1/288; C02F 2101/30; C02F 2101/305; C02F 2101/006; C02F 2101/105; C02F 2101/12; C02F 2101/14; C02F 2101/16; C02F 2101/163; C02F 2101/166; C02F 2101/18; C02F 2101/20; C02F 2101/306; C02F 2101/32; C02F 2101/322
See application file for complete search history.

(56) References Cited

U.S. PATENT DOCUMENTS

| | | | |
|---|---|---|---|
| 5,520,816 A * | 5/1996 | Kuepper | 210/649 |
| 2002/0115113 A1* | 8/2002 | Lawman et al. | 435/7.2 |
| 2010/0266896 A1* | 10/2010 | Stromme et al. | 429/209 |

OTHER PUBLICATIONS

Shimidzu et al, Effective Adsorption-Desorption of Cations on a Polypyrrole-Polymer Anion Composite Electrode, Jan. 1986, J. Chem. Soc., Chem. Commun., pp. 1415-1417.*

*Primary Examiner* — Matthew O Savage
(74) *Attorney, Agent, or Firm* — Michael R. Williams; Ade & Company Inc.

(57) ABSTRACT

A method for removing one or more organic or inorganic solutes from a solution, comprising contacting the solution with one or more layers of filtration media, whereby the solute(s) are adsorbed onto one or more filtration layer(s) is described. Primarily, but not exclusively, the filtration media are polymers formed by polymerizing one or more hydrophilic electrically active monomers, with the subsequent addition of varying mole percent's of one or more counter anions. The solution can comprise a polar solvent such as a polar organic solvent or water or an aqueous solution. The solution may also be a non-polar solvent, or water and organic mixture. The hydrophillic monomer can be, for example, a heterocyclic group, such as pyrrole or thiophene. The counter anion can be any anion, such as polystyrene sulfonate. The varying hydrophobicity or hydrophilicity of the polymer filtration media is controlled by the type(s) and mole percent of counter anion(s) used.

17 Claims, 3 Drawing Sheets

METHOD OF FILTERING WATER USING AN ELECTRICALLY ACTIVE POLYMER COMPOSED OF PYRROLE MONOMERS HAVING COUNTER ANIONS ASSOCIATED THEREWITH

PRIOR APPLICATION INFORMATION

The instant application claims the benefit of U.S. Provisional patent application U.S. Ser. No. 61/642,870, filed May 4, 2012.

BACKGROUND OF THE INVENTION

A serious but under-reported issue regarding water was illustrated by a study which demonstrated the presence of at least 60 known pharmaceuticals in ground water. Of those examined, 30 were found with one or more contaminants occurring in about 80% of the samples. These included: clofibric acid, a cholesterol lowering drug; phenazone and fenofibrate, drugs used to regulate concentrations of lipids in the blood; and analgesics such as ibuprofen and diclofenac[1].

In another study, chemotherapy drugs, antibiotics and hormones were found in public drinking water sources[2].

In another study by the U.S Geological survey, 25 groundwater and 49 surface-water sources of public drinking water supply in 25 states and Puerto Rico were sampled and analyzed for 124 emerging contaminants. At least one contaminant was detected in 96% of the samples[3].

It has been known for over twenty years that pharmaceuticals, personal care products and other organic and inorganic contaminants are being released into the environment, many of which cause ecological and human health risks. In the last ten years, various methods for the analysis of potentially harmful trace environmental contaminants have been developed; however, options for the reduction of environmental exposure, particularly from waste water discharges, have yet to be fully examined. No currently applied or widely used waste water or potable water treatments or filtration systems are able to remove all trace levels of pharmaceuticals and other trace level contaminants. Many nano-filtration or extraction systems that would remove these contaminants are slow, low volume, expensive and often single use.

Thus, there is a need for a filtration method that is inexpensively prepared, as well as one that is simultaneously capable of filtering trace contaminants and large volumes of waters, wastewaters and other solutions. Such a method would enable the user to significantly diminish the contamination in, and thus the environmental impact of, their waste waters. Such a method would also allow a user to greatly reduce the amount of trace level contaminants in ground, surface and potable water supplies once environmental exposure has occurred.

Another issue with currently available commercial filters is that once the filter has reached its expiry or saturation limit, one or more things may occur:
  (i) The flow rate of the filtration method is greatly reduced, which may result in damage due to excessive back pressure in the system.
  (ii) Reaching the saturation point does not decrease the flow rates but instead increases the flow rates. However, the capacity for the filtration media to remove the desired solutes once at saturation is greatly diminished, meaning that the filtrate may still contains many or all of the undesired components.
  (iii) The overused filter may have bacterial or mold growth, and/or may produce water with poor taste, smell and/or color.

Most often, premature filter changes (changes of filters prior to saturation) are carried out to prevent the above mentioned effects. These may be costly and wasteful if the filters are still usable. For example, waste water volumes may vary seasonally, requiring more frequent changes in summer months and fewer in winter months.

Thus, there is a need for a filtration method that can also incorporate a method for expiry notification. Specifically, if the filtration media used had a detectable color change or voltage change upon saturation, such a change could be used to notify the user that expiration is imminent.

SUMMARY OF THE INVENTION

According to a first aspect of the invention, there is provided a method of filtering a fluid to remove at least one solute of interest comprising: providing a filtration medium comprising at least one layer of an electrically active polymer backbone comprising cyclic or heterocyclic monomers; flowing a fluid suspected of comprising at least one solute of interest over or through the filtration medium such that the solute of interest is retained within the filtration medium; and recovering the filtered fluid.

The electrically active polymer may have associated therewith at least one counter anion.

The monomer may be a hydrophobic monomer or a hydrophilic monomer.

The electrically active polymer may comprise at least one hydrophilic monomer and at least one hydrophobic monomer.

The monomer may undergo an energy change upon an oxidation or reduction reaction with the solute. The energy change is a colour change, electrical conductivity change or conformational change.

The filtration media may also include at least one layer selected from the group consisting of: activated carbon; silica; organosilica compounds; and ion exchange porous resins.

The layer of filtration medium may have a morphology selected from the group consisting of: open nanotubes; closed nanotubes; single-walled tubes; multi-walled tubes; whiskers; membranes; films; coatings, powder; crystalline structures; semi-crystalline structures and beads.

The fluid, whether in liquid or gas phase, may be selected from the group consisting of: groundwater; surface water; industrial wastewater; municipal wastewater; potable water; hydraulic fracturing fluid; waste hydraulic fracturing fluid; hydrocarbon mixture; blood; urine; cerebrospinal fluid; synovial fluid; a tissue extract; a soil extract; a food substance; and an extract of a food substance.

The monomer may be a heterocyclic monomer selected from the group consisting of: a cyclic nucleotide; a pyrrolyl group; a pyrrolidonyl group; a furyl group; a thiophenyl, group; and a pyridyl group.

The hydrophobic monomer may be selected from the group consisting of: a phenyl group; a phenylene group; a vinyl group; and a straight chain or branched $C_2$-$C_{18}$-alkyl group; or any combination thereof.

The counter anion may be selected from the group consisting of: acetates; nitriles, nitrides; nitrites; nitrates; fluorides; chlorides; bromides; iodides; borates; carbides; silicides; carbonates; oxalates; oxides; chlorates; chlorites; manganates; phosphides; phosphates; chromates; sulphate;

sulphides; sulphites; cyanides; thiocyanates; hydrides; hydroxides; sulfonates; hippurates; nucleotides; polynucleotides; and amino acids.

The solute of interest may be selected from the group consisting of: a metal contaminant; a dissolved salt; a volatile organic compound; a hydrocarbon; benzene; toluene; ethyl benzene; xylene; an organic contaminant; an inorganic contaminant; a disinfection by-product; a pharmaceutical; an insecticide; a pesticide; a herbicide; a biomolecule; a toxin; a pollutant; a metabolite; a radioisotope; and a radiotracer.

The dissolved salt may be selected from the group consisting of: a metal salt; a chlorine salt; a fluorine salt; a bromine salt; an iodine salt; a phosphate salt; a sulfate salt; a nitrate salt; a nitrite salt; an ammonium salt; and, a cyanide ion.

The biomolecule may be selected from the group consisting of a protein; a vitamin; a neutraceutical; a hormone; a polypeptide; a polynucleotide; a lipid; a carbohydrate; and a combination thereof.

The solute of interest may be a biological contaminant, for example, a prokaryote; a eukaryote; a virus; and a prion.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Current extraction methods involving polymers primarily use the individual monomer components of the backbone as the point of affinity for the solutes of interest. However, the covalent bonding between individual compounds that result in polymerization can be difficult to control, as well as being time and energy consuming.

A polymer is comprised of individual monomer units, like chain links. The polymerization, by oxidation, or other chemical or physical means, links the units together to form a chain. The length, strength, fluid solubility, and whether it is a straight or branched chain is dependent on various specific aspects of the reaction, such as temperature, the type(s) of monomer units used, solvents used and the time of the reaction. However, the fundamental structure of a polymer backbone is this basic monomer chain, irrespective of the overall physical appearance.

An investigation into the potential use of various types of backbones resulted in the conclusion that cyclic and heterocyclic electrically active backbones with a dispersed charge along the backbone are a viable alternative for filtration media. Specifically, it was found that using ion-ion interactions instead of large chain covalent bonds results in a water insoluble 'salt' polymer, called a doped polymer. These ion-ion interactions that hold the anion to the backbone are not covalent. Ionic solids have higher melting and boiling point temperatures because the ionic bond is very strong. Since these polymers are large ionic solids, they are not readily soluble in most solvents, and do not rapidly degrade due to changes in pressure and temperature, making them robust and effective for a wide range of fluid filtrations. Also, as a result of the dispersed charge along these polymer backbones, they can be doped with various anions that can be individually selected for customizability. That is to say, not only are the doped "salt" polymers robust and relatively environmentally inert, they are readily altered depending on the end users specific application of interest.

The anionic components of the salt, or the dopants, can be varied to give differing filtration characteristics, instead of varying the individual monomer units in the backbone itself, which is the more common method of varying polymers characteristics.

There are many factors that affect the solubility of a compound, such as the temperature of the solvent. For example, it is easier to dissolve sugar in a hot cup of tea rather than in ice water. However, another factor that affects the solubility of a compound is polarity. A common rule for predicting solubility based on polarity is the phrase "like dissolves like" or by the simple observation that oil and water do not mix. This indicates that a solute will dissolve best in a solvent that has the most similar chemical structure to itself. As discussed in greater detail below, the invention exploits this simplified rule of solubility. For example, a highly polar (hydrophilic) compound, such as acetylsalicylic acid, would be highly soluble in water, less soluble in fairly polar methanol, and virtually insoluble in non-polar solvents such as benzene. Conversely, a non-polar (hydrophobic) compound, such as the hormone testosterone, is insoluble in water, more soluble in ethers, and is highly soluble in non-polar solvents, such as chloroform or vegetable oils.

By adding counter anion(s) that are either more "like oil" or more "like water" to the backbone structure, which in itself can be more or less hydrophilic or hydrophobic, we can preferentially remove solutes of specific polarities. For example, to remove testosterone from water, we could use a steric acid counter anion on a thiophene based backbone. Both steric acid (a component in many animal and vegetable oils) and thiophene are non-polar or hydrophobic. Since testosterone has very limited solubility in water, but much higher solubility in non-polar compounds, it will preferentially move from the water and be retained by the steric acid and thiophene. As more water is run through the filter, the testosterone will not re-dissolve in the water because it would not be energetically favourable, which is to say that it would require too much energy to release it from its binding with the polymer, even at raised temperatures or pressures.

The counter anion(s) can be comprised of a hydrophobic moiety, such as a long chain hydrocarbon or fatty acid like docosahexaenoic acid (DHA), a hydrophilic moiety, such as a sulfate, or be characterized by pi-pi interactions as found in cyclic anions, such as nucleotides and other sugars. Alternatively, the counter anion can be any anion, such as polystyrene sulfonate.

The hydrophobicity and hydrophilicity of the polymer can thus be varied by the inclusion of one or more counter anions of differing characteristics and interactions in varying mole percentages. For example, if there were only non-polar solutes of interest to be removed, a polymer backbone could be engineered with 100 mole percent non-polar anions. If there was an equal mixture of polar and non-polar contaminants, a polymer backbone could be engineered with a 50:50 mole percent non-polar and polar anion mix so that both types of contaminants could be removed. Or, if it was known that the contaminants in the fluid of interest were primarily polar, such as acetasalicylic acid, but that some were also highly non-polar, such as benzene, a polymer could be manufactured that was 90 mole percent of hydrophilic (polar) anions and 10 mole percent hydrophobic (non-polar) anions. This would be useful to prevent the polar anion sites from becoming saturated before all the polar contaminants were removed, or conversely from having extra non-polar sites left over once all the non-polar contaminants were removed.

The more fully doped the backbone is, the more capable or more effective it is as a filtration media. Thus, all of the possible doping sites along the backbone, or the sites that can hold onto an anion, are as fully loaded as possible, but not necessarily with the same anions.

The layering of these doped polymers with other types of filtration media, including but not limited to, activated carbon, silica, organosilica compounds, and ion exchange porous resins, provides improved filtration compared to other current filtration apparatuses.

The present invention relates to an improved method for removing one or more organic or inorganic solutes from a fluid, comprising contacting the fluid with at least one layer of filtration media, whereby the solute(s) are adsorbed onto one or more filtration layer(s).

Preferably, the filtration media is composed of polymers formed by polymerizing one or more (a) hydrophilic or hydrophobic electrically active monomers or (b) one or more hydrophilic or hydrophobic monomers that may undergo a change in energy when oxidized or reduced by one or more organic or inorganic solutes, with the subsequent addition of varying molar percentages' of one or more counter anions to either (a) or (b) whereby the solute or solutes of interest are adsorbed onto the fluid-insoluble doped polymer.

As will be appreciated by one of skill in the art, to a certain extent, "hydrophobic" and "hydrophilic" are relative terms. For example, compound A may be hydrophilic compared to compound B but hydrophobic compared to compound C.

Examples of suitable counter anions include but are by no means limited to suitable acetates; nitrides; nitrites; nitrates; fluorides; chlorides; bromides; iodides; borates; carbides; silicides; carbonates; oxalates; oxides; chlorates; chlorites; manganates; phosphides; phosphates; chromates; sulphate; sulphides; sulphites; cyanides; thiocyanates; hydrides; hydroxides; sulfonates; hippurates; nucleotides; polynucleotides; and amino acids.

In some embodiments of the invention, counter anions may be a mixture of anions, wherein each respective anion is specifically selected to remove a specific solute suspected of being dissolved or suspended in the fluid to be filtered. It is of note that in other embodiments, a specific counter anion may be selected to remove a particular class of solutes, for example, a family of solutes closely related by polarity and/or structure or other similar factors.

For example, select data is shown below for a series of experiments conducted to test the effectiveness of the adsorption properties of the various filtration media. Several organic compounds that are known to be environmentally persistent pharmaceuticals were chosen based on their varying polarity and functionality. Also, an endocrine disruptor, known as Bisphenol A (BPA) was chosen for testing. By having a range of structures, whether the compound is a pharmaceutical or other compound, allows us to make larger assumptions about the classes of compounds that can be removed as a whole. The broad functional groups included in the selection of these "contaminants" or solutes are: benzyl, phenyl, hydroxyls (alcohols), amides, azepines, chlorides and fluorides. These groups allow for various intermolecular interactions to occur, thus binding or adsorbing the solute or contaminant of interest to the filtration media via these semi-permanent interactions. These interactions are also involved in the concepts of solubility and polarity, and are another way to select for customization based on the primary "like dissolves like" principle. Some types of intermolecular interactions are pi-pi, cation-pi, hydrogen bonding, or in the case of metals, a chelating effect.

Specifically, pi-pi interactions are where the ring structures of two or more molecules interact electrostatically. To exploit this property, such as in the case of benzyl or phenyl groups of the contaminants, the backbone and doping anion should contain at least one ring in its repeating chain structure. In this case, the ring containing contaminant can interact with the ring structure of the backbone and the ring structure of the anionic species.

Another example could be where a waste stream or other fluid is known to contain various types of hydrocarbons. They may include long chain hydrocarbons as well as benzene, a ring structure hydrocarbon. Both long chain hydrocarbons as well as benzene are hydrophobic, which is the first characteristic that must be accounted for. If all of the contaminants need to be removed, a general selection of highly hydrophobic anions, such as diphenylamine-4-sulfonate, which contains rings to remove benzene, and a long chain hydrocarbon anion, such as dodecyl sulfate for long chain hydrocarbon removal, can be used.

If only benzene is of primary interest, then pi-pi interactions can be used, such as diphenylamine-4-sulfonate and 4,5-Dihydroxynaphthalene-2,7-disulfonic acid, which both interact strongly with ring containing structures. As previously discussed, polarity is similar to the "like dissolved like" concept. The more polar a compound, the more able it is to dissolve in water, whereas the less polar the compounds are, the more they behave like oils. However, further customization based on other interactions can be used to select an application appropriate anion with which to dope the polymer backbone.

The testing that was completed uses a selection of solutes of interests, chosen due to their particular polarities and functional groups. Since all compound classes containing similar structures and functional groups behave in a similar fashion to one another, the tested compounds can be used to represent much broader classes of compounds in terms of their affinity for adsorbing to our media. From the previous example, it can be seen that the media can be customized specifically to remove, for example, benzene, but due to the predictable behaviour of similar structures, the media can therefore be assumed to be as viable for the removal of, for example, toluene, ethylbenzene, xylenes and other similar structures. Likewise, though the selected results shown and discussed further below are for the pharmaceuticals atenolol, alprazolam, carbamazepine, metformin (HCl) and fluoxetine, as well as for BPA, the results apply to a wider range of any contaminant of interest that would interact, based on solubility, polarity or other intermolecular interactions, in a similar fashion. Atenolol, alprazolam, carbamazepine, fluoxetine and BPA were primarily chosen to represent various large molecular weight cyclic and long chain hydrocarbons with some ability to hydrogen bond or an interaction similar to chelating, like cation-pi interactions. Metformin was chosen as representative of small molecular weight polar compounds.

Some overlap in analogous doped polymers were used for cross checking and ruling out purposes to later inform our future synthesis. For example, if a certain media performed well in the removal of atenolol and carbamazepine, but failed to remove metformin and fluoxetine, it can be seen that the particular media examined is best able to remove moderately polar compounds, but is less able to remove highly polar or highly non-polar compounds. In general, we have seen that the tested media show evidence of removal of various large molecular weight non-polar cyclic, aromatic and other non-cyclic hydrocarbons (more "like" oils), as well as many polar, hydrogen bonding compounds (more "like" water). In many cases, we have seen close to 100% removal of the study contaminants during testing.

In preferred embodiments, the monomer is an electrically active cyclic or heterocyclic group, such as a pyrrolidonyl group, furyl group, thiophenyl, pyridyl group or benzene. Cyclic refers to ringed compounds that are comprised of only one type of atom. For example, benzene is a six membered ring comprised solely of carbon. Heterocyclic compounds refer to ringed compounds that are comprised of at least two different atoms. For example, furan is a five membered ring comprised of four carbons and one oxygen. The cyclic or heterocyclic group may be: unsaturated, such as pyrrole; saturated, such as hexane; or aromatic, such as benzene. Suitable heterocyclic monomers include but are by no means limited to, for example, pyrrole; furan; thiophene; 3,4-Ethylenedioxythiophene; a cyclic nucleotide; a sugar; a pyrrolyl group; a pyrrolidonyl group; a furyl group a thiophenyl, group; and a pyridyl group. Suitable cyclic monomers include but are by no means limited to benzene; quinones; phenols; a phenyl group; and a phenylene group.

An electrically active cyclic or heterocyclic group refers to those compounds which are capable of being oxidized or reduced. Oxidization refers to a compound losing electrons from its structure. Reduction refers to a compound gaining electrons into its structure. When a compound is oxidized, or has electrons removed, it becomes electrically conductive. This occurs because when an electron is removed, it leaves a 'hole' in the electronic structure. Electrons will flow into the hole to fill it, leaving another hole behind from which they came, and other electrons will flow to fill in that gap. When a compound is reduced, or has electrons added, it loses its ability to conduct electricity. This occurs because the added electrons fill the holes, preventing the other electrons from moving, since there are no longer any holes for them to fill. When these electrically active groups undergo reduction or oxidation by one or more target solutes, they undergo a change in energy, which can be seen as a colour change, a density change or a detectible change in electrical conductivity.

Examples of suitable cyclic or heterocyclic monomers that are capable of undergoing a change in energy when oxidized or reduced by one or more organic or inorganic solutes include but are by no means limited to pyrrole, furan, thiophene, 1,4-Benzoquinone, and 3,4-Ethylenedioxythiophene.

Primarily, electrically active polymers (EAPs) are comprised of cyclic and heterocyclic monomers because of the ease with which these compounds can be oxidized or reduced. For non-cyclic molecules, it is difficult to create electrically conductive polymers, because of the lack of stability from a less conjugated, or less overlapped system. A ring structure has many overlapping electron orbitals, so when a charge is induced, the other atoms in the ring can share the load, and help stabilize cation. In a straight chain polymer, with non-cyclic monomer units, there is less orbital overlap, and the charge is more distinctly associated with one individual atom, which is a less stable formation. There are examples of non-cyclic EAPs, but the invention is limited to the use of EAPs, with either a homo or heteropolymer backbone, from cyclic and heterocyclic monomers and their associated counter ions.

Subsequent layering of other filtration media can be used to further filter other solute(s) of interest.

The fluid may be a liquid for example a solution or water or the fluid may be a gas, as discussed herein.

The solution can comprise a polar solvent, such as a polar organic solvent, or water, or an aqueous solution. The solution may also be a non-polar solvent, or water and organic mixture. The varying hydrophobicity or hydrophilicity of the polymer filtration media is controlled by the type(s) and mole percent of counter anion(s) used.

It will be readily apparent to one of skill in the art that either by changing the backbone to another cyclic or heterocyclic monomer, or by varying the associated anions, different solutes or targets of interest can be retained, as discussed above. The backbone, and its variations, can be optimized as a complimentary aid in the removal of the targets of interest.

As will be appreciated by one of skill in the art, any suitable fluid may be filtered using the methods and materials described herein. As discussed herein, the backbone and counter anion(s) of the electrically active polymer may be selected to target specific solutes suspected to be present in the fluid. Examples of suitable fluids, whether liquid or gas phase, to be filtered include but are by no means limited to groundwater; surface water; industrial wastewater; hydraulic fracturing fluid; municipal wastewater; potable water; blood; urine; cerebrospinal fluid; synovial fluid; a tissue extract; a soil extract; a food substance; an aqueous solution; a hydrocarbon mixture; a mixture of polar organic solvents; a mixture of water and a polar solvent; a non-polar organic solvent; a mixture of water and a polar organic solvent and an extract of a food substance.

An illustrative example of an "aqueous solution" may be for example an intentionally made solution, such as a solution made as part of a manufacturing process, for example, a pharmaceutical solution.

An illustrative example of a mixture of polar organic solvents may be for example a mixture of ethanol and methanol and one or more solutes.

An illustrative example of non-polar organic solvents may be for example a fluid such as crude oil which may be filtered to remove impurities.

As will be readily apparent to one of skill in the art, a wide range of solutes can be removed from a fluid of interest by selecting suitable backbones and counter anions. Suitable solutes that can be filtered out include but are by no means limited to a metal contaminant; a petrochemical; a dissolved salt; a volatile organic compound; an organic contaminant; a disinfection by-product; a pharmaceutical; an insecticide; a pesticide; a herbicide; a biomolecule; a toxin; a pollutant; a metabolite; a radioisotope; and a radiotracer. As will be appreciated by one of skill in the art, as used herein, terms such as "radioisotope", "radiotracer", "petrochemical", "herbicide", "pharmaceutical", "pesticide", "insecticide", "toxin", "pollutant", "biomolecule" and the like include breakdown products thereof.

Suitable illustrative examples of a dissolved salt include but are by no means limited to a metal salt; a chlorine salt; a fluorine salt; a bromine salt; an iodine salt; a phosphate salt; a sulfate salt; a nitrate salt; a nitrite salt; an ammonium salt; and, a cyanide ion.

Suitable illustrative examples of biomolecules include but are by no means limited to a protein; a vitamin; a nutraceutical; a hormone; a polypeptide; a polynucleotide; a lipid; a carbohydrate; and combinations thereof.

In other embodiments, the solute of interest may be a biological contaminant, for example but by no means limited to a prokaryotic cell; a eukaryotic cell; a virus; and a prion.

For example, a homopolymer of pyrrole shown in FIG. 2 and discussed below, can aid in the removal of any contaminant with hydrogen bonding capabilities, and any target solute with polar groups because of the presence of the nitrogen. Also, the nitrogen can help with the chelation of metals.

If, for example, a non-polar anion is used in association with the more polar pyrrole backbone, the electrically active polymer will be useful in the removal of surfactant (half polar, half non-polar) and amphoteric (both an acid and a base) targets, such as amino acids, cholesterols or estrogens.

For example, pyrrole may be selected in a situation where there is a primarily non-polar organic solute of interest that is somewhat capable of hydrogen bonding. If the solute or contaminant of interest is phenol, which is a benzene like six carbon ring with an alcohol functional group that is capable of hydrogen bonding, pyrrole would be an appropriate choice, since it is a nitrogen containing ring structure, which can exploit pi-pi interactions, as well as being capable of hydrogen bonding at the nitrogen.

A thiophene backbone is similar in structure to pyrrole, but in the place of the nitrogen, there is a (larger) sulfur atom. Because of this difference, thiophene backbones are non-polar, and can be used to remove non-polar solutes of interest, such as oils and greases.

Thus, by varying the backbone by using homopolymers of monomers such as pyrrole, thiophene, furan or biphenyls, the filter media can be tailored to more fully remove specific targets of interest.

In some embodiments, heteropolymers of two or more cyclic or heterocyclic groups, in combination with polar and non-polar counter anions are used as "all in one" filtration media. The "all in one" heteropolymer/multiple anion filtration media would be useful as a household pitcher filter, where multiple contaminants need to be simultaneously removed.

An "all in one" filter will be excessive for many applications and having filters that can selectively remove only different classes of compounds may be less expensive in some cases, or it may be a requirement that many other solutes are not retained by the filtration media as in the case of selective removal of a specific contaminant during pharmaceutical production.

One application of the homopolymer backbone with a single anion species associated with the backbone is that it can be tailored to interact with a specific target, such as would be needed in pharmaceutical production to remove contaminants while "ignoring" the desired final product and allowing this product to remain in solution.

As discussed above, in some embodiments, hydrophilic monomers that undergo a change in energy when oxidized or reduced by one or more organic or inorganic solutes are used within the invention. The potential and colour changes were noted with some polymer-anion compounds that were synthesized. It was to be expected that some change would occur, since the cyclic and heterocyclic backbones are electrically conductive. However, some polymers expand when "full" of the target, while some contract in volume. Similarly, some polymers increase or decrease in conductivity and others undergo a colour change. When this was found in association with the compounds that are also expected to give the best retention of certain targets, the application for a potential indicator of filter expiry was examined.

One such example is a PEDOT-Sulfate polymer. When fully reduced, or when it has all the electrons in its structure that it needs, it is a dark, opaque purple colour. When the PEDOT-Sulfate polymer is oxidized, or when it loses electrons, it changes to a transparent pale blue-gray colour. If this polymer is exposed to, and/or interacts with (i.e. filters out) oxidizing metals, such as dissolved salts of Lead, Iron or Calcium, the polymer will change from dark purple to light blue in colour. Conversely, if the PEDOT-Sulfate polymer is originally in its fully oxidized light blue form and is used to filter out phenolic groups, an example of which is the common phenol sprays used as sore throat and canker sore treatments, but is also present in many detergents and a large collection of other drugs and herbicides, the polymer will be reduced, and change into its dark opaque purple form.

Some polymers only undergo a slight colour change when chemically oxidized or reduced. One such example is the polypyrrole-chloride polymer. Its fully reduced colour is a dark green, and its oxidized colour is a slightly lighter green, which would be difficult to detect as a visual indicator. However, the more oxidized version is more conductive, while the more reduced form is less conductive. It has been seen that the conductivity difference from the fully reduced to fully oxidized forms have orders of magnitude in difference (between $10^6$ and $10^8$ Siemens per meter electrical conductivity). In a filter apparatus, an unlit LED could be attached to the filter such that the LED will only turn on when enough current reaches it, or when the filter is fully used. Alternatively, it could be an LED that would "dim" and/or go out as the current decreases, indicating that the filter must be changed.

Figure 1:
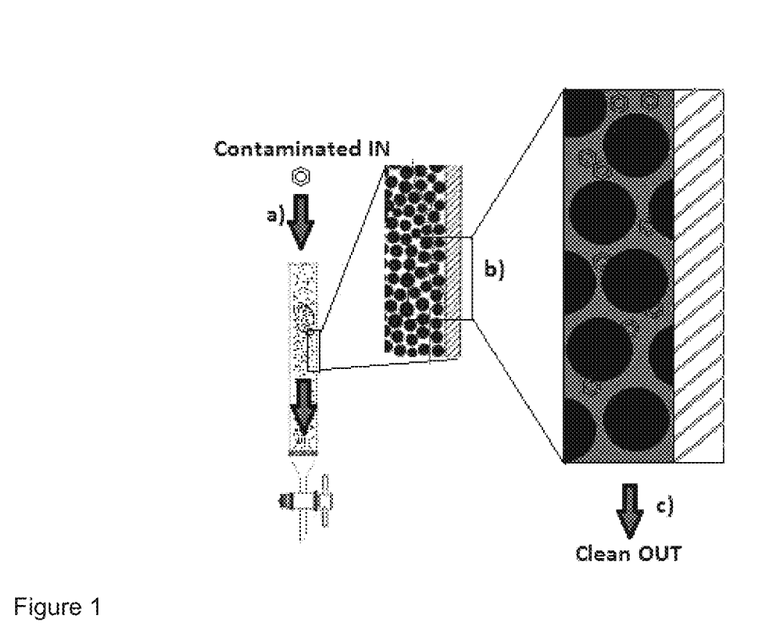
FIG. 1 illustrates the general method of the invention.

The method of the invention is depicted schematically in FIG. 1. As can be seen, a fluid containing solute(s) of interest is added to the filtration system. As the fluid flows around, through and/or over the filtration medium, the solute interacts with the polymer and is retained. In this manner, the solute(s) of interest are removed from the fluid.

Figure 2:
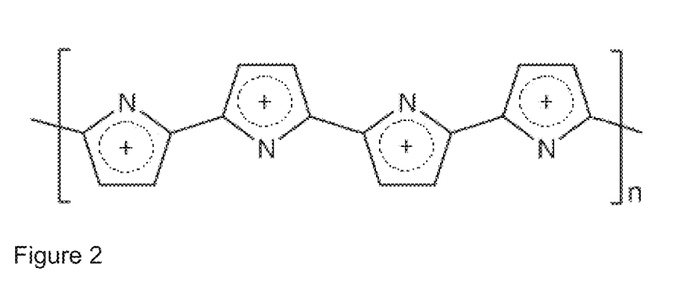
FIG. 2 shows a poly-pyrrole chain with no counter anions.

In one embodiment of the invention, the polymer is a poly(pyrrole)-poly[poly(sodium 4-styrene-sulfonate)] polymer, shown in FIG. 2. As can be seen in this figure, the poly-pyrrole chain has no counter anions. Note the positive charge is within a hatched circle to indicate that the charge is dispersed around the ring, and is not in fact specifically associated with any one atom.

Figure 3:
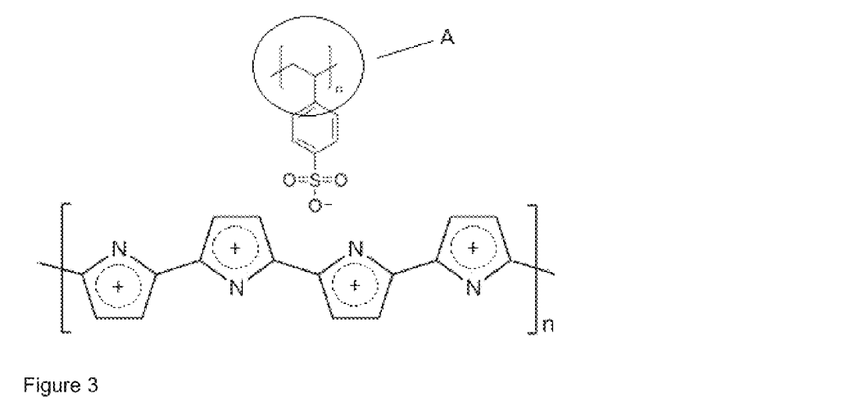
FIG. 3 shows a poly(pyrrole)-poly[poly(sodium-4-styrene-sulfonate)] polymer.

FIG. 3 shows a poly(pyrrole)-poly[poly(sodium 4-styrene-sulfonate)] polymer. It should be noted that the upper center of the anion is a large hydrophobic moiety, denoted by A.

Many current methods of chromatography and other separation dependent extractions rely on affinity binding as the primary means by which to separate a target from a mobile fluid. This is based on the principle that "like dissolves like." However, prior art methods vary the characteristics of their polymers by varying the backbone to be either more hydrophobic or more hydrophilic. In contrast, in the instant invention, the counter anion is varied, as discussed above.

Specifically, in the above example, it can be seen that the affinity for a hydrophobic moiety is not primarily within the backbone, but in the counter anion, or dopants associated with the backbone. That is, the hydrophobic component "A" as seen in FIG. 3 will interact with the hydrophobic component of a target solute. This type of polymer can them be used to remove many different hydrophobic contaminants, including but not limited to oils, greases, progesterone, testosterone (and other large hormones), trihalomethanes (THMs) and multi-ring higher molecular weight pharmaceuticals, such as PROZAC™ or ZOLOFT™.

For example, if a target of interest is also hydrophobic, it will have a greater affinity for the A component of the example polymer, as seen in FIG. 3. If the target analyte is for example, bisphenol A (BPA), a hydrophobic contaminant, it is readily soluble in organics, but is poorly soluble in water. Thus, if the BPA in water were to flow around or through the above example polymer, it would be more likely to bind to the solid polymer, and break its far weaker ties with water.

The tested filter media, with results as discussed below, and the filtered water they contained, were allowed to sit for an additional (a) 2 hours and (b) 1 week to determine if any leaching of the target solutes would occur from the filter media. Testing after 2 hours and 1 week gave the same results, within analytical error, indicating that the target is likely to be semi-permanently bound. This means that the target compound will not wash back out into the water over time and use. However, since the bonding of the target with the filter media is not actually permanent (i.e. not a covalent bond) the target can be removed by washing of the filter media with another solvent, with which the target has an even greater affinity, like some organic solvents, such as ethanol or acetone. Thus, in these embodiments, BPA, or other similar compounds, can be recovered by washing the filter medium with an organic solvent such as ethanol or acetone.

In general, once a filter is saturated with a target contaminant, whether the contaminant is polar or non-polar, it can be washed off the filter using a solvent other than the fluid from which the contaminant was removed. This would allow for the target solute, as well as the filtration media, to be regenerated. For example, in the removal of testosterone from water, the use of a steric acid anion with a thiophene backbone, which are both hydrophobic, could be used to remove the hydrophobic testosterone. Once the filtration media becomes saturated with testosterone, a chloroform or dehydrated alcohol flush can be used. Testosterone is removed from water because it prefers to interact with the non-polar steric acid, and can be removed from the steric acid anion by chloroform or alcohol because it is even more soluble in those solvents. This means that it is energetically favourable for the testosterone to move from the water to the steric acid anion on the polymer backbone, and from the polymer to the chloroform or alcohol solvent. In a similar manner, depending on the solute of interest, a solvent can be found which the contaminant more highly favours than the filtration media. By using the target molecules particular affinity for one phase, either polar or non-polar, it can be washed from the media and recovered while the filter media can be regenerated.

It should also be noted that these compounds, depending on the method and time used in polymerization, form different morphologies. For example, some of the polymers that have been examined form a thick, oily tar like substance, which is excellent at coating surfaces, but this formation is seen when the reaction is catalyzed quickly, such as when the full required reaction volume of the oxidizer was added in a matter of seconds. One example is a poly(pyrrole)-poly(camphor-10-sulfonic acid) polymer.

Other polymers, such as a PEDOT-sulfate, if oxidized to polymerization quite slowly, such as if it is added drop-wise over the course of minutes rather than seconds, will form long threads that are believed to be similar to a nanotube structure, which may be used as a fibrous membrane.

Yet further, if some of the polymers of the invention are heated in the presence of propanol, they are capable of forming a downy, highly porous media, such as was observed with a poly(thiophene)-poly(p-toluenesulfonic acid) polymer.

The various morphologies are useful in physically entrapping larger entities of interest, while still retaining their affinity for certain targets. For example, the specific morphology can be selected to tailor the flow rates. That is, the larger the structure, the higher the flow rate through the media for example, a granular or sandy textured morphology will have a faster flow rate when compared to a very fine powder, but the chemical interactions are the same. Alternately, the smaller, more tightly woven morphologies, such as with nanotubes, remove a greater percentage of the target due to the increased surface area of interaction, consequently have slower flow rates. As will be appreciated by one of skill in the art, the polymer-based filtration media described herein is very flexible for a given backbone by virtue of the ability to substitute counter anions, alter the quantity of counter anions and alter the morphology of the polymer.

Another example of potential customization that can be seen without experimentation is the use of phosphonate anions, which are known to be chelating agents. These are known to bind various metals, specifically heavy metals. Similarly, their structural analogues, aminopolycarboxylates are useful chelating anions. An example of a suitable phosphonate is ethylenediamine tetra(methylene phosphonic acid) or EDTMP. One example of a suitable aminopolycarboxylate is Ethylenediaminetetraacetic acid, or EDTA. Therefore, it can be seen that counter anions or dopants such as these could be used alone or in combination to form a powerful filtration media for the removal of metals.

Figure 4:
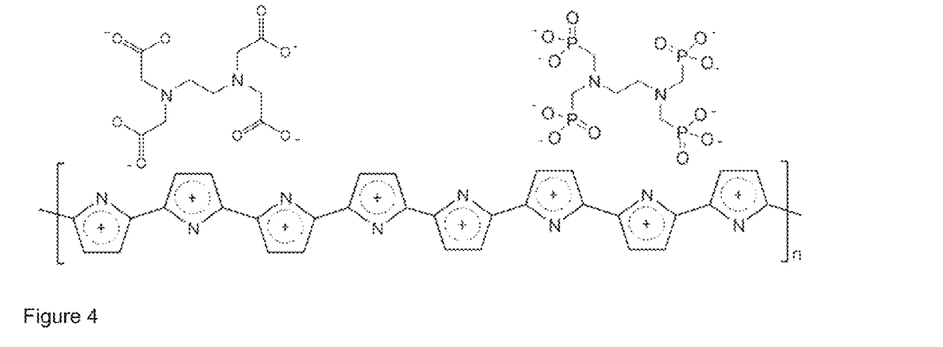
FIG. 4 shows a fifty-fifty mole percent poly(pyrrole)-poly(EDTA)/poly(EDTMP).

FIG. 4 shows a fifty-fifty mole percent poly(pyrrole)-poly(EDTA)/poly(EDTMP).

It should be noted that FIG. 4 is for illustrative purposes and is not necessarily indicative of the actual geometry of the polymer backbone, or its associated anions. Specifically, as will be appreciated by one of skill in the art, the anions may be associated with the backbone in a statistically random pattern. For example, there may be multiple EDTA anions in a row, then multiple EDTMP anions afterwards, or it they may alternate one after the other in a pattern as illustrated above.

Figure 5:
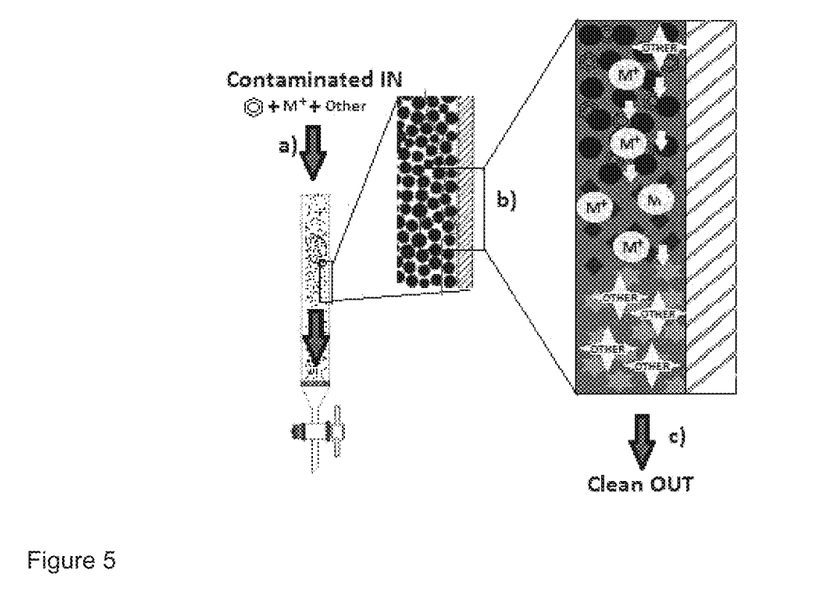
FIG. 5 is a schematic diagram of one possible embodiment of the invention.

It can be seen from the examples above that either of these filtration media would be useful individually, but as layered components of one apparatus, they may be even more useful. By layering the different types of filtration media, more solutes can be removed than by just one type of media alone, as illustrated in FIG. 5. As will be appreciated by one of skill in the art, specific filtration media can be selected based on the knowledge of the nature of the fluid to be filtered so that specific solutes can be preferentially targeted. For example, a solute expected to be at a particularly high level may be preferentially targeted or a solute which is of considerable concern even if present in trace amounts may be targeted.

For example, trihalomethanes and trace pharmaceuticals are often found in drinking water. Cyanide and ammonia are often found in industrial waste waters from the mining industry. A sewage lagoon will contain many different ions, such as sulfates, nitrates, nitrites and phosphates. Different filtration media can be tailored to each different type of water to target the specific contaminants of concern.

To tailor the media to the target fluid, the contaminants of concern can be examined to determine their polarity or solubility, as well as any other intermolecular interactions that would occur. In most cases, industrial and municipal fluid streams of interest are well catalogued and monitored for contaminants, and as such, information about concentrations and types of contaminants present are well known. Once the fluid contaminant properties are known, a similar examination of backbones and possible doping anions can be accomplished. The selection would be based on the general theories of polarity, solubility and other molecular interactions. This will allow the most appropriate pair of backbone and anion, or layers of such types of media, to be selected for use in that particular application without individual experimentation or repetitive validation. This process is similar, for one familiar in the art, to selecting an appropriate column, solvent and approximate starting gradient in chromatography when the analyte is known, where subsequent adjustments may need to be made for optimization, but the fundamentals are understood.

For example, if a fluid stream is known to be contaminated with several heavy metals, a known chelating anion and pyrrole backbone would be chosen over a thiophene or other backbone. The chelating agent would give most of the removal of the metals, and the nitrogen containing pyrrole, since nitrogen compounds form known chelates as well, could be used to aid in the chelating process.

An example of a layered filtration apparatus of the invention is shown schematically in FIG. 5. It should be noted that this is for illustrative purposes only, and that the filtration media may be in membranes, coatings or forms other than as layered solids.

As can be seen in FIG. 5, contaminated water flows through filtration apparatus. In this example, the water sample is contaminated with benzene or another hydrophobic moiety and also contains calcium, iron, lead and another contaminant, for example, chlorine.

The first layer of the filter comprises a poly(pyrrole)-poly[poly(sodium-4-styrene-sulfonate)] which as discussed above will remove BPA, benzene or other similar hydrophobic solutes. The second layer is a 50-50 mole percent poly(pyrrole)-poly(EDTA)/poly(EDTMP) which removes metals, as discussed above. Layer 3 in FIG. 5 can be either another polymer filtration media, or it may be a layer of other material known in the art. For example, this layer may be activated charcoal, silica, functionalized organosilica compounds, or ion exchange porous resins. These are known to remove certain contaminants, such as cyanide ions or phosphates. A layered or mixed combination with our filtration media would result in an advanced filtration apparatus, more capable of removing the desired targets than any one affinity media alone. Clean water flows out of filtration apparatus, with the targeted compounds retained.

As can be seen in FIG. 5, the first layer removes organics such as benzene, BPA, oils and grease. The second layer removes metals such as lead, calcium and iron. The third layer, using prior art filters, or another optimized polymer media, removes chlorine and other solutes typically removed by prior art filters.

Other examples of suitable fluids or "dirty" water include but are by no means limited to groundwater, surface water, industrial wastewater, municipal wastewater and potable water. The invention will now be further illustrated by way of examples; however, the invention is not necessarily limited to or by the examples.

EXAMPLES

In order to test and confirm the effect of doping the polymer media on their polarities and their customizability for filtration, various media were produced using methods similar to the below example. Once the media were prepared, they were then washed and dried as outlined below. Various contaminants that would demonstrate a wide range of different bonding capabilities of the filtering media, were prepared in standard solutions, were brought into contact with the media, and the resultant "filtrate" analyzed by an appropriate analytical method.

The specific doping process can be accomplished in various ways.

Example 1

A monomer, such as pyrrole, to which a commercially available oxidizing agent, preferably a ferric salt, containing the dopant anion is used for polymerization, added in an approximately 1:2 to 1:4 mmole ratio.

Example 2

Where a commercially prepared oxidizing agent that contains the dopant anion is unavailable, an excess of an appropriate salt containing the dopant anion dissolved in water (or other solvent as required) to which is added the monomer, such as pyrrole can be used. A dilute solution of an oxidizing agent is then added until completion of polymerization. Conversely, a concentrated oxidizing agent may be used and added slowly (drop wise for example) to the monomer/salt solution until completion of polymerization.

Example 3

Where a commercially prepared oxidizing agent that contains the dopant anion is unavailable, an excess of an appropriate salt containing the dopant anion dissolved in water (or other solvent as required) to which is added the monomer, such as pyrrole can be used. To this solution, two conductive electrodes (an anode and a cathode) are added. A voltage is applied by connecting the electrodes to the anode and cathode of a power source. The solution is stirred while the voltage is applied until completion of polymerization.

Example 4

Where a commercially prepared oxidizing agent that contains the dopant anion is unavailable, we may prepare the appropriate ferric salt, and proceed as per Example 1.

Ferric salts not commercially available may be prepared from freshly precipitated ferric hydroxide and three equivalents of the appropriate acid in water or methanol. In most cases, solid products can be obtained by removal of the solvent and vacuum drying the residue[4]. In those cases where the following procedure is ineffective and a solid product cannot be obtained, the above detailed Example 2 or Example 3 may be used for polymerization.

A representative procedure to obtain 250 g of non-commercially available oxidizing agent: Ferric Ethylbenzenesulfonate[4]

1. To an aqueous solution of 100 g (0.37 mol) of FeCl3.6H2O in 1400 mL water add a solution (44.4 g in 300 mL-1.11 mol) of NaOH. Stir vigorously.
2. Allow the precipitate to settle, and siphon off the supernatant, add water and stir for rinsing.
3. The brown ferric hydroxide can then be filtered through a 2 L medium frit sintered glass filter and washed once with water.
4. The precipitate can then be transferred to a 2 L flask containing 700 mL of methanol.
5. To the suspension add 200 g of ethylbenzenesulfonic acid (Aldrich 95%) in 300 mL of methanol.
6. Stir mixture for 3 hours at 45° C.
7. Filter the final solution and remove solvent on a rotary evaporator
8. The resultant oil should be transferred to a crystallizing dish, and further dried in a vacuum oven at 50° C.
9. The solid residue can then be ground into a powder and stored in a sealed container for use.

Polypyrrole can then be prepared by the reaction of 2 to 4 equivalents of the ferric salt with 1 equivalent of the pyrrole monomer in methanol solution, as per Example 1. The final polypyrrole products, containing the application appropriate dopants, can then be washed and are ready for use. All synthesized media were then washed using a narrow-bore Soxhlet extractor. The first wash was with, for example, isopropanol at 85° C. for a minimum of 3 hours, followed by water wash at 100° C. for a minimum of 3 hours. The media was then oven dried overnight at 45° C., allowed to cool and was kept in pre-cleaned sealed glass vials at room temperature until ready for use.

A sample of 0.250 g±0.01 g of each media compound was weighed using a four place analytical balance (Satorius CP224-S) and placed in clean 10 mL glass test tubes. A 3 mL aliquot of the standard contaminant of interest was then pipetted in to each of the test tubes. The tubes were then vortexed for 10 seconds to ensure full contact with the media. The supernatant was then drawn off using a syringe, and filtered through a 0.2 µm nylon membrane filter directly into 2 mL amber glass autosampler vials, and capped. The vials were immediately placed into a temperature controlled autosampler for use.

One set of media was tested for Bisphenol-A (BPA) retention. Standard solutions of BPA were prepared and analyzed by standard analytical methods for GC-MS/MS instrumentation. The results of the final BPA "filtrate" are given below. Each media used for the BPA test, labeled here as A through J represent individual custom configurations of backbone and anion combinations, as seen in table 1. The anions and backbones were chosen for variability of polarity as well as for pi-pi interactions.

Table 2 shows the results of a study of 10 compounds with various backbones and hydrophobic anions.

In this study, a BPA spiked water solution was allowed to interact with the filtration compounds for 15 minutes, which was the amount of time required for the water to filter through the commercial pitcher filter. All samples were run using GC-MS, with a detection limit (D.L) of 0.100 ppm.

The filter media in table 2 were organized by performance data. It should be noted that compounds G, H, I and J showed results less than our available detection limit, indicating that while some of the filter media compounds performed as well as currently available products, some performed significantly better. The different filtration media better retain the hydrophobic BPA as the media and associated anions increase in hydrophobicity. The polypyrrole with chloride and hydroxides are the most polar or hydrophilic, and have no ability to interact via pi-pi interactions, and so the BPA has the least affinity for those media. The polythiophene is less polar than polypyrrole, and gives good pi-pi interactions, and the anion sodium dodecyl sulphate is the most hydrophobic, and has the best retention of hydrophobic, ring containing BPA. This demonstrates that optimization for targets can be accomplished based on considerations of the intermolecular forces between the contaminant of interest and the selected media.

TABLE 1

Types of backbone and anions selected for BPA testing

| Tested Media for BPA Retention | Backbone/Anion |
|---|---|
| A | Polypyrrole/Chlorine |
| B | Polypyrrole/Hydroxide |
| C | Polypyrrole/Phosphate |
| D | Polypyrrole/Sulfate |
| E | Poly(3,4-ethylenedioxythiophene)/Chlorine |
| F | Poly(3,4-ethylenedioxythiophene)/Hydroxide |
| G | Poly(3,4-ethylenedioxythiophene)/Phosphate |
| H | Poly(3,4-ethylenedioxythiophene)/Poly(4-styrenesulfonate |
| I | Polythiophene/Poly(4-styrenesulfonate) |
| J | Polythiophene/Sodium dodecyl sulfate |

TABLE 2

Results summary for the BPA test

| Filter Media | Initial spike amount of BPA (ppm) | Final BPA concentration observed (ppm) | % BPA Retained |
|---|---|---|---|
| A | 2 | 0.884389094 | 55.78% |
| B | 2 | 0.714235658 | 64.29% |
| C | 2 | 0.576470187 | 71.18% |
| D | 2 | 0.320248526 | 83.99% |
| E | 2 | 0.253349053 | 87.33% |
| F | 2 | 0.218874728 | 89.06% |
| G | 2 | <DL | 100% |
| H | 2 | <DL | 100% |
| I | 2 | <DL | 100% |
| J | 2 | <DL | 100% |

A second set of media were produced by the above exemplified method, and tested for retention of various commonly found pharmaceuticals. All backbones used were polypyrrole. Pyrrole was selected as the backbone as it is inexpensive, readily available and easily polymerized. Also, pyrrole has a ring structure, that can give pi-pi interaction, as well as a nitrogen group that can be associated with hydrogen bonding and metals chelating, which allows for pyrrole to be more widely useful across a broader range of contaminants. It should be noted that the anions listed below in Table 3 were not used solely in equal ratios, however in all cases, the dominant anion, by mole percent, is listed first. In some cases for example, the same combination of anions in a different mole percent were tested for comparison. The pharmaceuticals tested were chosen based on their different functionalities, and therefore their ability to represent broad classes of chemicals, and their commonness of being prescribed, which therefore increases their likelihood of being found in environmentally relevant samples.

Standard solutions of the pharmaceuticals of interest were prepared and analyzed by analytical methods for HPLC-MS/MS instrumentation. Each media used for the pharmaceutical test, labeled here as 1 through 15 in Table 3 below, represent individual custom configurations of polypyrrole backbone and anion combinations.

The results of the final pharmaceutical "filtrate" are given below in Tables 4 and 5. When comparing the results, the polypyrrole with chloride doped species is the base polymer, and all uptake results with the other dopants can be compared with this polymer. Looking at the uptake of the different drugs with this base polymer, there is a trend in that the general uptake of Carbamazapine is greatest, followed by Alprazolam, Fluoxetine, Metformin and Atenolol respectively.

Comparing the structure of the dopants, going from Carbamazapine to Atenolol, it is notable that.
i) The degree of aromaticity and/or pi conjugation decreases. Pi-Pi interactions (pi stacking) is clearly important in determining which polymer-dopant combination will be effective.
ii) Atenolol is also much larger than the other drug molecules, which likely affects its ability to interact with both the dopant and polymer due to stearic (size) hindrance.

The camphor doped polypyrrole does not work as well as the chloride doped species, likely because it does not itself provide any aromaticity for the drugs to interact with via pi stacking. Specifically, its hydrogen bond accepting capacity (due to the SO3— moiety) is not enough to outweigh the lack of aromaticity. In addition, it actually would prevent better pi-pi interactions between the drugs and the polymer aromaticity (sterically), which is why the uptake values are so much lower than that for the chloride doped polymer, since chloride is a much smaller group. Carbamapazine performs the best because of its hydrogen bond donating amide group and more importantly because it has the best aromaticity and smallest size (least affected by steric effects of camphor). Thus, the experimental results agree with what was theoretically predicted before testing.

Similarly, theoretically, the dihydroxynaphthalene disulfonic acid doped species should perform better than the chloride doped polymer for the uptake of all of the drugs because of the conjugated aromaticity of the naphthalene moiety and its hydrogen bond donating (OH) and accepting (SO3—) moieties. This is also what was experimentally observed. The Poly(sodium 4-styrene-sulfonate) is similar to Dihydroxynaphthalene disulfonic acid and therefore when doped into the polypyrrole works well for similar reasons.

In general, the sodium dodecyl sulfate doped species is not as good as the chloride doped species. Dodecyl sulfate can be a hydrogen bond acceptor, but does not have any aromaticity for interaction. The docusate doped polymer worked well not due to aromaticity, but perhaps in addition to the hydrogen bond accepting sulfonate moiety of docusate, the dipole-dipole interactions possible with its ester moieties also help with binding. Sodium diphenylamine-4-sulfonate doped polypyrrole works well because of its aromatic moieties and the hydrogen bond donating amine and hydrogen bond accepting sulfonate moieties.

The sulfate doped polymer can be a hydrogen bond acceptor. It could be involved in ion-dipole or dipole-dipole interactions. It is also sterically smaller than the other dopants discussed thus far, and therefore allows for good pi-interactions between the polymer and drugs. The results expected and observed for the acetate and phosphate doped species are similar to sulfate. The observed difference between the two acetate species (one doped using sodium acetate, the other with copper (II) sulfate) is due to differences in the resulting synthesized polymer backbone.

The fluoride doped species has ion-dipole interactions that are possible. Fluoride is also a stronger hydrogen bond acceptor than a chloride group. The hydroxide doped species has ion-dipole interactions in addition to being a hydrogen bond donor and acceptor, which explains why this species works better for metformin than the fluoride doped species.

The tetraborate doped polymer has ion dipole interactions as well as multiple hydrogen bond accepting oxygens which explain its performance.

Doping a polymer with acetate, sulfate, chloride, and phosphate appears to have a synergistic effect, which is to say the different moieties interact slightly differently with all of the drugs individually, so together they have an additive effect. This was expected theoretically and was seen experimentally.

In general, the observed experimental results for each of the doped species interactions with the selected group of compounds agree with the initial theoretical assumptions. This indicates that random "guess and check" experimentation will not be necessary to select appropriate polymers for specific filtration applications. Instead, a group or groups can be tested and fine-tuned for customization.

For example, if sulfate is not considered to be a good choice for a specific application, similar interacting species, such as acetates or phosphates, should not be chosen either. If pi-interactions are considered the most important bonding factor, and stearic hindrance (size of the contaminant) is not an issue, then a pi-conjugated dopant would be selected. If stearic hindrance is considered an issue, but pi-interactions are still the most important in the adoption of the contaminant, then a small species such as fluoride or chloride would be chosen. If stearic hindrance is an issue, and the pi-interactions are likely supplemented by good hydrogen bonding interactions, then fluoride or hydroxide would be chosen over chloride, and so forth. Thus, undue experimentation can be avoided by a yes or no flow-chart type elimination of prospective dopants.

TABLE 3

Types anions selected for pharmaceutical testing

| Tested Media for Pharmacetical Retention | Anion(s) |
|---|---|
| 1 | (+)-Camphor-10-sulfonic acid, Chlorine |
| 2 | 4,5-Dihydroxynaphthalene-2,7-disulfonic acid, Chlorine |
| 3 | Poly(sodium 4-styrene-sulfonate), Chlorine |
| 4 | Sodium dodecyl sulfate, Chlorine |
| 5 | Docusate Sodium, Chlorine |
| 6 | Sodium diphenylamine-4-sulfonate, Chlorine |
| 7 | Sulfate |
| 8 | Acetate, Chloride |
| 9 | Phosphate |
| 10 | Fluoride, Chloride |
| 11 | Hydroxide, Chloride |
| 12 | Acetate, Chloride |
| 13 | Tetraborate, Chloride |
| 14 | Acetate, Sulfate, Chloride, Phosphate |
| 15 | Chloride |

TABLE 4

Results summary for the pharmaceuticals test in parts per million:

| Sample: | Initial ppb (Each): | Atenolol ppb final: | Alprazolam ppb final: | Carbamazapine ppb final: | Metformin HCl ppb final: | Fluoxetine ppb final: |
|---|---|---|---|---|---|---|
| 1 | 200 | 200 | 142 | 96 | 184 | 163 |
| 2 | 200 | <DL | <DL | <DL | <DL | <DL |
| 3 | 200 | <DL | <DL | 15 | <DL | <DL |
| 4 | 200 | 110 | 36 | 59 | 175 | <DL |
| 5 | 200 | 170 | 12 | 4 | 3 | 4 |
| 6 | 200 | 117 | <DL | <DL | 36 | 5 |
| 7 | 200 | 18 | <DL | <DL | 2 | 9 |
| 8 | 200 | 24 | <DL | <DL | 9 | 5 |
| 9 | 200 | <DL | 11 | 29 | <DL | <DL |
| 10 | 200 | 86 | <DL | <DL | 132 | 24 |
| 11 | 200 | 153 | 1.9 | <DL | 54 | 72 |
| 12 | 200 | 174 | 2.4 | <DL | 46 | 77 |
| 13 | 200 | 114 | <DL | <DL | 50 | 57 |
| 14 | 200 | <DL | <DL | <DL | <DL | 1.7 |
| 15 | 200 | 78 | 26 | 13 | 75 | 49 |

*Detection limit (DL)

TABLE 5

A summary of removal percentages

| Sample | Atenolol Removed | Alprazolam Removed | Carbamazapine Removed | Metformin HCl Removed | Fluoxetine Removed |
|---|---|---|---|---|---|
| 1 | 0% | 29% | 52% | 8% | 19% |
| 2 | >99% | >99% | >99% | >99% | >99% |
| 3 | >99% | >99% | 93% | >99% | >99% |
| 4 | 45% | 82% | 71% | 13% | >99% |
| 5 | 15% | 94% | 98% | 99% | 98% |
| 6 | 42% | >99% | >99% | 82% | 98% |
| 7 | 91% | >99% | >99% | 99% | 96% |
| 8 | 88% | >99% | >99% | 96% | 98% |
| 9 | >99% | 95% | 86% | >99% | >99% |
| 10 | 57% | >99% | >99% | 34% | 88% |
| 11 | 24% | 99% | >99% | 73% | 64% |
| 12 | 13% | 99% | >99% | 77% | 62% |
| 13 | 43% | >99% | >99% | 75% | 73% |
| 14 | >99% | >99% | >99% | >99% | 99% |
| 15 | 61% | 87% | 94% | 63% | 76% |

REFERENCE

1. Sacher, F., Lange, F. T., Brauch, H-J., and Blankenhorn, I. 2001, *Pharmaceuticals in groundwaters Analytical methods and results of a monitoring program in Baden-Württemberg, Germany*: Journal of Chromatography A, v. 938, p. 199-210
2. Benotti, M., Trenholm, R. A., Vanderford, B. J., Holady, J. C., Stanford, B. D. and Snyder, S. A., 2009, *Pharmaceuticals and Endocrine Disrupting Compounds in U.S. Drinking Water*: Environmental Science & Technology, v. 43, no. 3, p. 597-603
3. Focazio, M. J., Kolpin, D. W., Barnes, K. K., Furlong, E. T., Meyer, M. T., Zaugg, S. D., Barber, L. B., and Thurman, E. M., 2008, *A national reconnaissance of pharmaceuticals and other organic wastewater contaminants in the United States—II. Untreated drinking water sources*: Science of the Total Environment, v. 402, no. 2-3, p. 201-216
4. Walker, J. A., Warren, I. F., and Witucki, E. F. 1988, *New Chemically Prepared Conducting "Pyrrole Blacks"*: Journal of Polymer Science: Part A: Polymer Chemistry, v. 26, p, 1285-1294

The invention claimed is:

1. A method of filtering water to remove at least one solute of interest comprising:
   providing a filtration medium comprising of at least one layer of an electrically active polymer composed of pyrrole monomers, wherein the electrically active polymer has associated therewith through ion-ion interaction at least one counter anion, said at least one counter anion being selected for intermolecular interaction with the solute of interest for removing said solute of interest from the water, said counter anion being selected from the group consisting of : acetates; nitrides; nitriles; nitrites; nitrates; fluorides; chlorides; bromides; iodides; borates; carbides; silicides; carbonates; oxalates; oxides; chlorates; chlorites; manganates; phosphides; phosphates; chromates; sulphate; sulphides; sulphites; cyanides; thiocyanates; hydrides; hydroxides; sulfonates; hippurates; nucleotides; polynucleotides; and amino acids;
   flowing the water comprising said solute of interest over or through the filtration medium such that the solute of interest-interacts with said counter anion such that said solute of interest is removed from the water and is retained within the filtration medium;
   and recovering the filtered water,
   wherein said filtration media is regenerated by washing the solute of interest off the filtration medium with a solvent that is more energetically favorable for the solute of interest than the filtration medium.

2. The method according to claim 1 wherein the monomer undergoes an energy change upon an oxidation or reduction reaction with the solute.

3. The method according to claim 2 wherein the energy change is a colour change, electrical conductivity change or conformational change.

4. The method according to claim 1 wherein the filtration media includes at least one layer selected from the group consisting of: activated carbon; silica; organosilica compounds; and ion exchange porous resins.

5. The method according to claim 1 wherein the layer of filtration medium has a morphology selected from the group consisting of: open nanotubes; closed nanotubes; single-walled tubes; multi-walled tubes; whiskers; membranes; films; coatings, powder; crystalline structures; semi-crystalline structures and beads.

6. The method of claim 1 wherein the solute of interest is selected from the group consisting of: a metal contaminant; a dissolved salt; a volatile organic compound; a hydrocarbon; benzene; ethyl benzene; toluene; xylene; an organic contaminant; a disinfection by-product; a pharmaceutical; an insecticide; a pesticide; a herbicide; a biomolecule; a toxin; a pollutant; a metabolite; a radioisotope; and a radiotracer.

7. The method of claim 6 wherein the dissolved salt is selected from the group consisting of: a metal salt; a chlorine salt; a fluorine salt; a bromine salt; an iodine salt; a phosphate salt; a sulfate salt; a nitrate salt; a nitrite salt; an ammonium salt; and, a cyanide ion.

8. The method of claim 6 wherein the biomolecule is selected from the group consisting of a protein; a vitamin; a neutraceutical; a hormone; a polypeptide; a polynucleotide; a lipid; a carbohydrate; and a combination thereof.

9. The method of claim 6 wherein the solute of interest is a pharmaceutical.

10. The method according to claim 1 wherein the solute of interest is a biological contaminant.

11. The method of claim 10 wherein the biological contaminant is selected from the group consisting of: a prokaryote; a eukaryote; a virus; and a prion.

12. A method of filtering water to remove at least one hydrophobic pharmaceutical comprising:
providing a filtration medium comprising of at least one layer of an electrically active polymer composed of pyrrole monomers, wherein the electrically active polymer has associated therewith through ion-ion interaction at least one counter anion, said at least one counter anion being selected for intermolecular interaction with the hydrophobic pharmaceutical for removing said hydrophobic pharmaceutical from the water, said counter anion being selected from the group consisting of : acetates; nitrides; nitriles; nitrites; nitrates; fluorides; chlorides; bromides; iodides; borates; carbides; silicides; carbonates; oxalates; oxides; chlorates; chlorites; manganates; phosphides; phosphates; chromates; sulphate; sulphides; sulphites; cyanides; thiocyanates; hydrides; hydroxides; sulfonates; hippurates; nucleotides; polynucleotides; and amino acids;
flowing the water comprising said hydrophobic pharmaceutical over or through the filtration medium such that the hydrophobic pharmaceutical interacts with said counter anion such that said hydrophobic pharmaceutical is removed from the water and is retained within the filtration medium;
and recovering the filtered water.

13. The method according to claim 12 wherein said filtration media is regenerated by washing the hydrophobic pharmaceutical off the filtration medium with a solvent that is more energetically favorable for the hydrophobic pharmaceutical than the filtration medium.

14. The method according to claim 12 wherein the monomer undergoes an energy change upon an oxidation or reduction reaction with the solute.

15. The method according to claim 14 wherein the energy change is a colour change, electrical conductivity change or conformational change.

16. The method according to claim 12 wherein the filtration media includes at least one layer selected from the group consisting of: activated carbon; silica; organosilica compounds; and ion exchange porous resins.

17. The method according to claim 12 wherein the layer of filtration medium has a morphology selected from the group consisting of: open nanotubes; closed nanotubes; single-walled tubes; multi-walled tubes; whiskers; membranes; films; coatings, powder; crystalline structures; semi-crystalline structures and beads.

* * * * *